(12) United States Patent
Heidasch

(10) Patent No.: US 7,774,404 B2
(45) Date of Patent: Aug. 10, 2010

(54) MANAGING SOFTWARE COMPONENT VERSIONS WITHIN A SERVICE ORIENTED ARCHITECTURE

(75) Inventor: Robert Heidasch, Speyer (DE)

(73) Assignee: SAP AG, Walldorf (DE)

( * ) Notice: Subject to any disclaimer, the term of this patent is extended or adjusted under 35 U.S.C. 154(b) by 148 days.

(21) Appl. No.: 12/138,968

(22) Filed: Jun. 13, 2008

(65) Prior Publication Data

US 2009/0313335 A1 Dec. 17, 2009

(51) Int. Cl.
*G06F 15/16* (2006.01)
*G06F 9/44* (2006.01)

(52) U.S. Cl. ............... 709/201; 709/206; 709/223; 709/230; 709/224; 725/94; 725/117; 725/118; 725/97; 713/153; 713/167; 713/165; 717/170

(58) Field of Classification Search ............... 709/201, 709/223, 206, 230
See application file for complete search history.

(56) References Cited

U.S. PATENT DOCUMENTS

2008/0140760 A1* 6/2008 Conner et al. .............. 709/201
2009/0013010 A1* 1/2009 Fang et al. ................. 707/203

* cited by examiner

*Primary Examiner*—Jude J Jean Gilles
(74) *Attorney, Agent, or Firm*—Fountainhead Law Group P.C.

(57) ABSTRACT

In one embodiment the present invention includes a method for managing versions of various software components in a service-oriented architecture. A software component representing a service provider includes a message dispatcher to analyze a service request message received from a service consumer, and to determine whether the service request message specifies version mapping information. If the message does include version mapping information, a conversion algorithm is selected based on the version mapping information specified in the service request message. The message is then converted according to the selected conversion algorithm before being processed by the processing logic of the service provider. A service reply message is similarly converted before being sent to the service consumer.

20 Claims, 9 Drawing Sheets

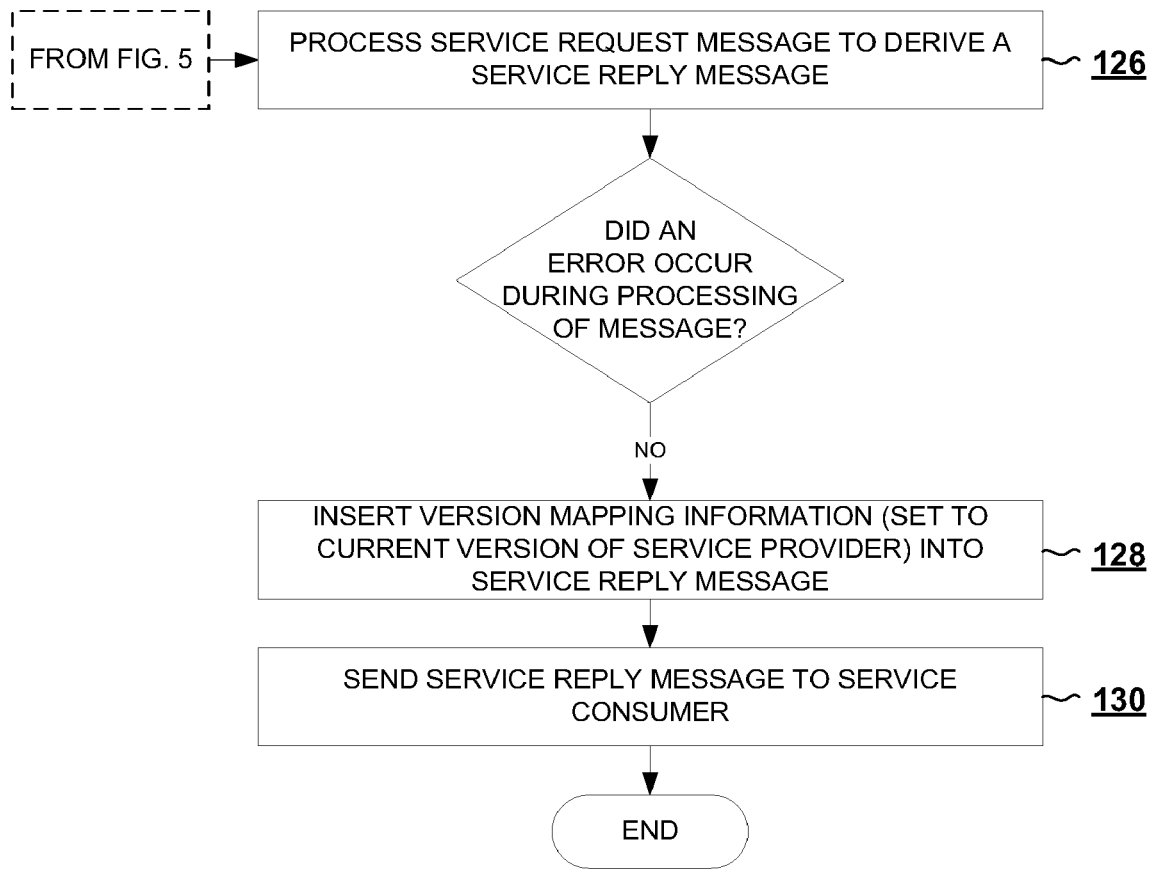
FIG. 5-A

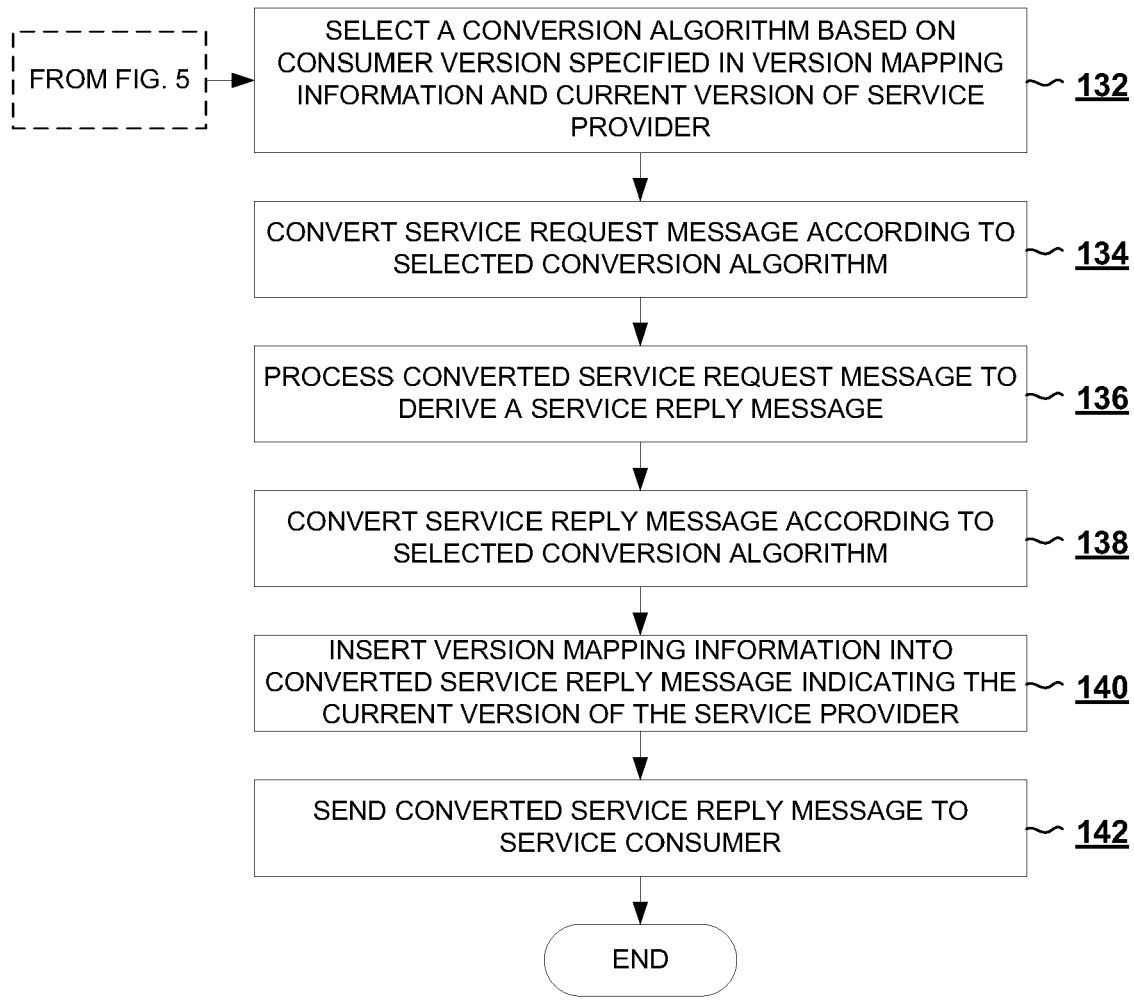
FIG. 5-B

MANAGING SOFTWARE COMPONENT VERSIONS WITHIN A SERVICE ORIENTED ARCHITECTURE

CROSS REFERENCE TO RELATED APPLICATIONS

Not Applicable.

BACKGROUND

The present invention relates generally to the development and deployment of software services in a computer-based system having a service-oriented architecture. In particular, the present invention relates to an apparatus, method, and computer program product for managing software component versions in a computer-based system having a service-oriented architecture.

In the realm of computer software systems, a service-oriented architecture (SOA) is an architectural style for creating and using business processes that are implemented with code modules typically packaged as services. Each service in a service-oriented architecture is implemented as a code module, function, object, or widget (collectively referred to herein as a software component) that is separately usable or deployable to perform a predefined task or function. An application or business process may be implemented by combining the various services of several software components. One of the fundamental principles of a service-oriented architecture is that the various services be loosely coupled, such that the services maintain a relationship that minimizes dependencies and only requires that the services maintain an awareness of one another. Accordingly, the implementation details of one service are essentially irrelevant to another service, so long as the services can communicate with one another.

In general, the services in a service-oriented architecture communicate with one another by passing data in the form of messages. Having awareness of a service means that one service "understands" the required format and data content to be included in a message sent to another service in order for that message to be properly received and processed by the other service. Accordingly, each service typically has one or more interfaces, which determine the number and nature (e.g., attributes such as data types and lengths) of the inputs expected in a service request message directed to the service. If one service—for instance, a service consumer—has knowledge of the interface of another service—for instance, a service provider—then the service consumer can direct a proper service request message to the service provider. However, problems often arise when a service is modified, such that the new version of the service has a different interface and expects different inputs (or, provides different outputs) than the previous version. In such a case, a service consumer may direct a service request message conforming to an interface of the service provider's former version, resulting in an error. Consequently, a version change to one software component (e.g., a service provider) might render several software components (e.g., service consumers) incompatible and therefore obsolete.

One solution to this problem is to utilize a middleware component, as illustrated in FIG. 1. FIG. 1 illustrates an example of a web service implemented in a service-oriented architectural environment, having a service consumer 10 communicatively connected over a network 12 with a service provider 14. As illustrated in FIG. 1, the service provider 14 includes an interface 16 and processing logic 18. From the perspective of the service consumer 10, the particular implementation of the processing logic 18 of the service provider 14 is irrelevant. However, in order for the service consumer 10 to communicate with and utilize the services of the service provider 14, the service consumer 10 must be able to generate a service request message that conforms to the specification of the interface 16 of the service provider 14. To ensure that a modification to the interface of the service provider 14 does not negatively impact the service consumer 10, the service consumer directs all service request messages to the middleware component 20. The middleware component 20, in turn, includes message conversion logic 22 to convert the service request message, if necessary, to ensure the service request message satisfies the expected inputs of the interface 16 of the service provider 14.

Unfortunately, such a solution adds to the overall complexity of the system by requiring the service consumer 10 to communicate indirectly with the service provider 14 through the middleware component 20, instead of directly with the service provider 14. Moreover, if a new version of the service provider 14 results in a changed interface 16, the conversion logic 22 of the middleware component 20 must be updated accordingly before the service consumer 10 can communicate with the service provider 14. If the new version of the service provider 14 and the new version of the middleware component 20 are not deployed simultaneously, a service consumer 10 is likely to encounter an error in communicating with the new version of the service provider 14. Furthermore, it is often the case that a developer or administrator responsible for the service provider 14 will have little if any technical knowledge about the middleware component 20, and the message conversion logic 22 in particular. Moreover, the developer or administrator responsible for the service provider 14 may not have access to the host system on which the middleware component 20 resides and executes. Hence, the overall amount of resources (e.g., developers or administrators, and time) required for making the necessary changes increases. Thus, there is a need for improving software component version management.

SUMMARY

Embodiments of the present invention improve the management of software component version control in a service-oriented architecture. In one embodiment, the present invention includes a method whereby a software component representing a service provider includes a message dispatcher that analyzes a service request message received from a service consumer. In particular, the message dispatcher of the service provider analyzes the service request message to determine whether the service request message specifies version mapping information. Version mapping information is information included in the service request message indicating which conversion algorithm of several conversion algorithms is to be used to convert a service request message for use with a particular version of the service provider. If the service request message specifies version mapping information, the message dispatcher selects an appropriate conversion algorithm based on the version mapping information specified in the service request message. The selected conversion algorithm is utilized to convert the service request message before the message is forwarded to the processing logic where it is processed to derive a service reply message. The service reply message generated by the processing logic is then returned to the message converter where the previously selected conversion algorithm is used to convert the service reply message so that is suitable for the service consumer. Finally, the converted service reply message is sent to the service consumer.

In one embodiment of the invention, if the service request message received at the message dispatcher of the service provider does not include version mapping information, then the service request message is forwarded directly to the processing logic of the service provider for processing. If the processing of the service request message occurs without error, version mapping information is then inserted into the service reply message that is sent back to the service consumer. In particular, the version mapping information inserted into the service reply message includes a consumer version and a provider version both set to the current version of the service provider. Accordingly, a subsequent service request message from the service consumer will include the version mapping information and signal to the message dispatcher which version of the service provider is consistent with the current version of the service consumer.

In one embodiment of the invention, if a service provider is modified, resulting in a new version of the service provider, the new version information is passed along to the service consumer in a service reply message sent to the service consumer. Accordingly, any subsequent service request message can include the proper version information in the version mapping information, thereby allowing the message dispatcher to properly route the message to the correct conversion algorithm for conversion before processing by the processing logic.

The following detailed description and accompanying drawings provide a more thorough description of the nature and advantages of the present invention.

DETAILED DESCRIPTION

Described herein are techniques for managing software component versions in a computer-based system having a service-oriented architecture. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
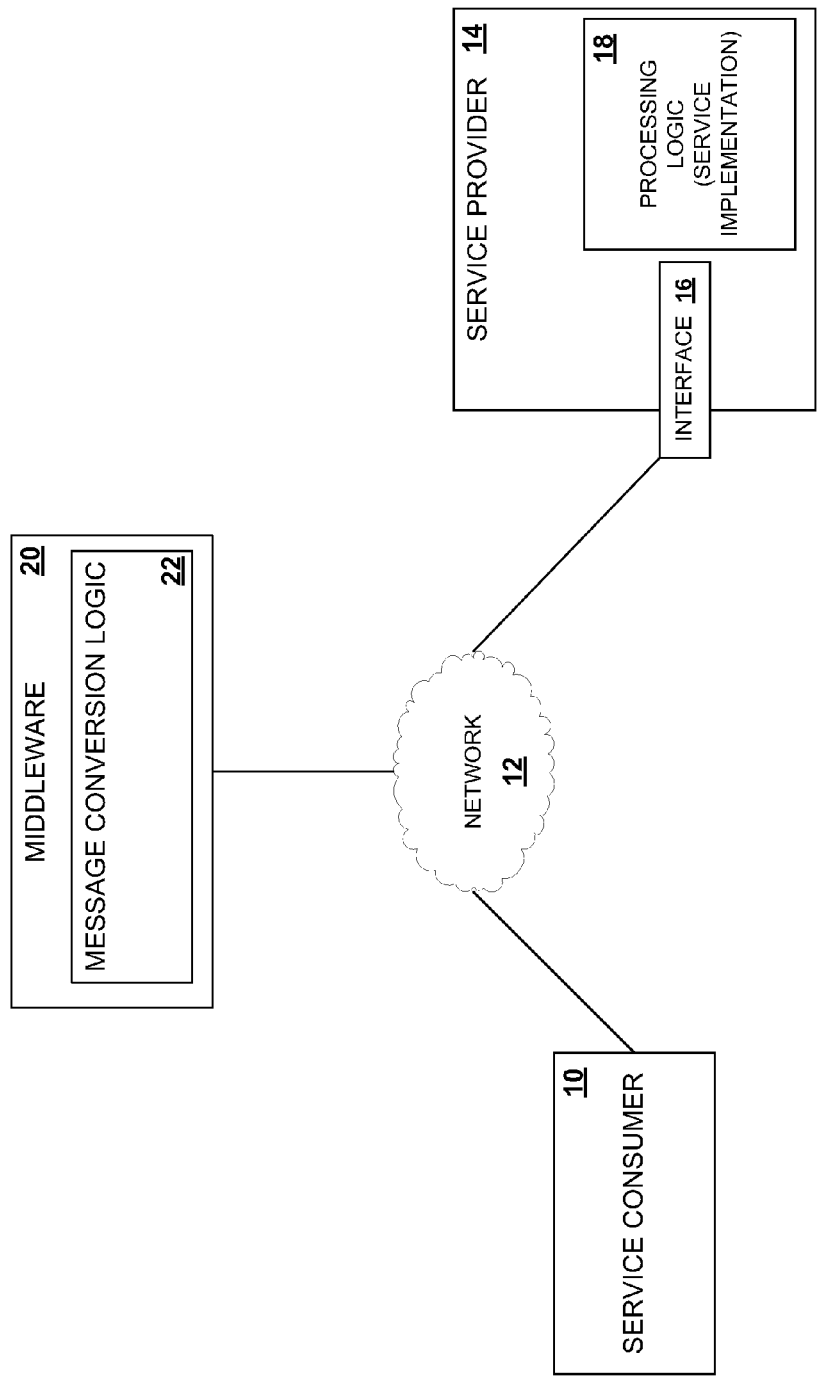
FIG. 1 illustrates an example of a prior art computer-based application based on a service-oriented architecture, having a service consumer indirectly in communication over a network with a service provider by means of a middleware component.
Figure 2:
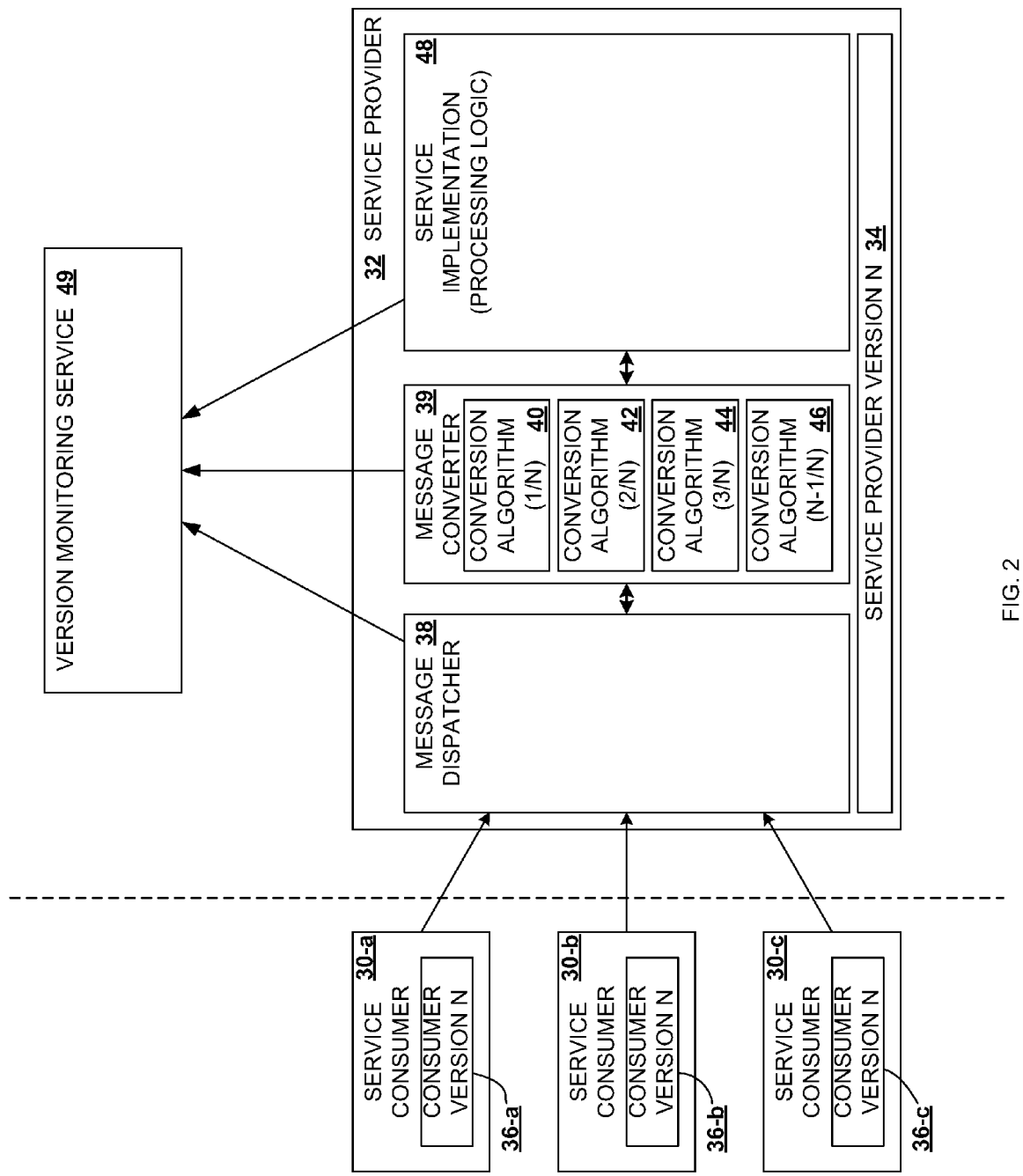
FIG. 2 illustrates an example of the basic architecture for a software component implementing a service provider with version mapping functionality, according to an embodiment of the invention.

FIG. 2 illustrates an example of the basic architecture for a software component implementing a service provider 32 with version mapping functionality, according to an embodiment of the invention. As illustrated in FIG. 2, there are three service consumers 30-a, 30-b and 30-c and a service provider 32. Each service consumer 30-a, 30-b and 30-c and the server provider 32 represent a separately deployable software component providing a particular service in a service-oriented architecture. In one embodiment of the invention, each software component has a unique version indicator, such as a version number 34, 36-a, 36-b and 36-c. Optionally, each software component may include an identifier to uniquely identify the software component. In one embodiment of the invention, the component identifier and the version identifier may be combined into a single identifier.

As a particular business process evolves, the software components providing the various services that implement the business process will also evolve. For example, software developers may modify and improve the software components to provide new and improved functionality. Accordingly, each new form of the software component is provided a new version designation. When initially deployed, version one of the service consumer 30-a may be compatible with version one of the service provider 32. In this case, being compatible means that a service consumer is configured to generate service request messages in a format that can be properly interpreted and processed by the processing logic of the service provider.

As the various software components representing the different services evolve, an embodiment of the invention as described in greater detail below ensures that a version change to one service does not render another service incompatible and therefore obsolete. Accordingly, one advantage of the invention is that a version change to the software component representing the service provider 32 does not render any of the software components representing the various service consumers (e.g., 30-a, 30-b, 30-c) obsolete. Moreover, each service consumer can be a different version. For instance, the software component representing one service consumer 30-a may be designated as version one, while the software components representing the other service consumers (e.g, 30-b and 30-c) may be designated as consumer versions two and three respectively. Despite each service consumer 30-a, 30-b and 30-c being a different version, each service consumer is compatible with the service provider 32. Moreover, a version change to the software component representing a service provider 32 or service consumer 30 does not require any modification to a middleware component that may require technical expertise outside the scope of the developer responsible for the service provider 32 or service consumer 30.

As illustrated in FIG. 2, the service provider 32 includes a message dispatcher 38 for analyzing service request messages to determine if the service request messages include version mapping information. Accordingly, the message dispatcher 38 dispatches messages to the appropriate conversion algorithm of the message converter 39, based on the version mapping information, if present in the service request message. The message converter 39 includes a number of message conversion algorithms 40, 42, 44 and 46. As described in greater detail below, each message conversion algorithm is configured to convert a message so as to make the message conform to a specification consistent with a particular version of the service provider and/or service consumer. For example, in one embodiment of the invention, a conversion algorithm converts a service request message received from a particular version of a service consumer, and converts the service request message to be compatible with the current version of the processing logic 48 of the service provider 32. After the processing logic 48 has processed the service request message, the same conversion algorithm is used to convert the resulting service reply message so that the converted service reply message is compatible with the version of the service consumer that initially generated the service request message.

As illustrated in FIG. 2, in one embodiment of the invention, one or more modules of a service may have means for communicating error messages to a monitoring service. For example, if a message conversion algorithm encounters an error when converting a particular service request message, or service reply message, the message converter 39 may report the error to the monitoring service 49. Similarly, the processing logic 48 and message dispatcher 38 may have the ability to communicate error messages to the monitoring service. An error message may include a variety of information about the error that occurred, for example, such as the version mapping information, if any, specified in the service request message, the actual current version of the service consumer or service provider, information about a particular input/output element which caused an error, and so on. The monitoring service 49 may have an error reporting repository where error information is stored. Furthermore, the monitoring service 49 may enable the automatic reporting of certain errors to one or more persons, for example, by email or other electronic notification. In one embodiment of the invention, the monitoring service may automatically identify the contact information of a person responsible for a particular software component that caused an error, for example, by performing a lookup operation in a table mapping software components to the developers responsible for such components. In one embodiment of the invention, the monitoring service may analyze the reported errors and determine when the number of errors associated with a particular software component exceeds a predetermined threshold. Accordingly, the monitoring service may send a notification about the errors only after the threshold has been reached.

Figure 3:
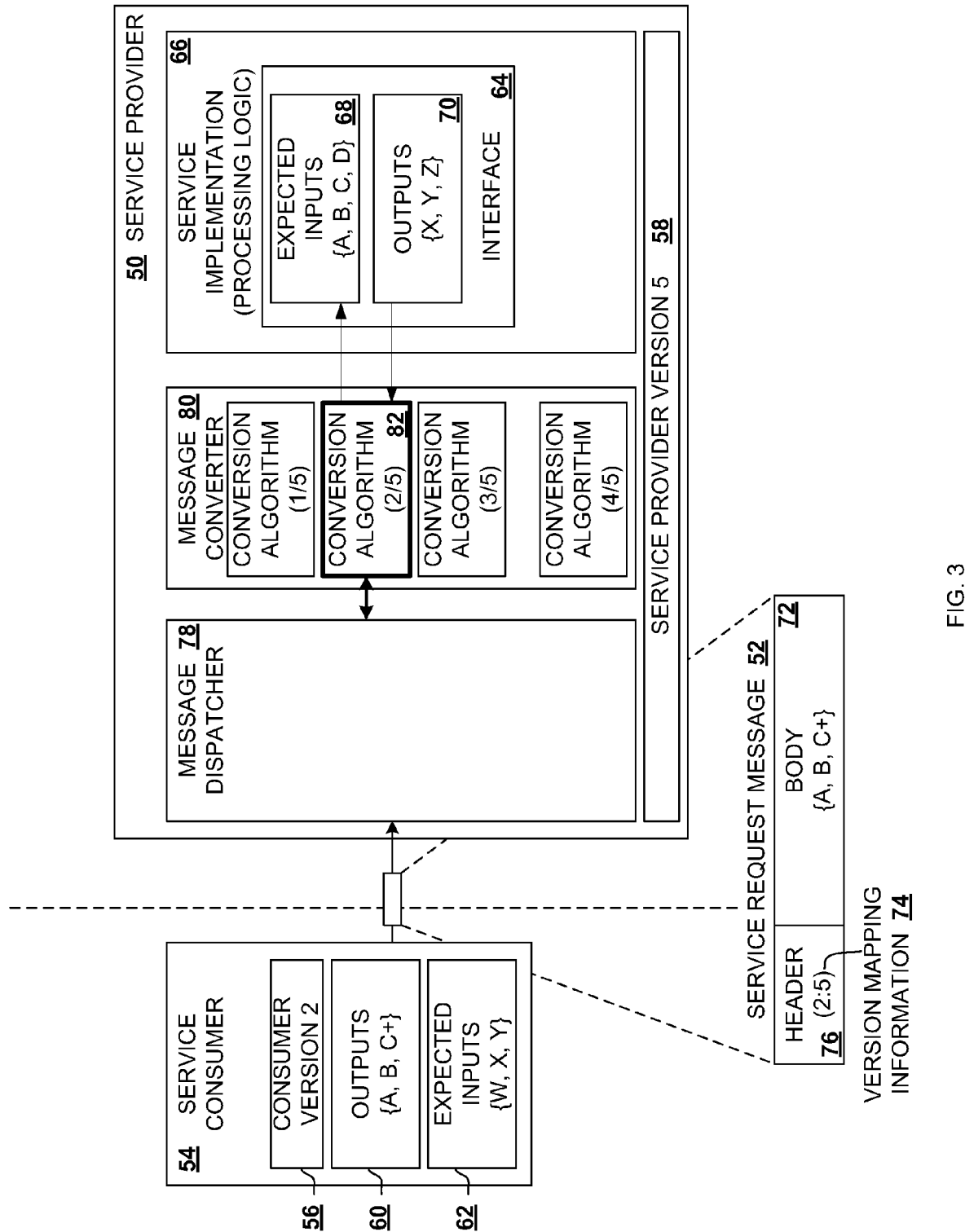
FIG. 3 illustrates an example of a software component implementing a service provider with version mapping functionality, receiving a service request message from a software component representing a service consumer, according to an embodiment of the invention.

FIG. 3 illustrates an example of a software component implementing a service provider 50 with version mapping functionality, receiving a service request message 52 from a software component representing a service consumer 54, according to an embodiment of the invention. As illustrated in FIG. 3, the software component representing the service consumer 54 is designated as version two of the software component, as indicated by the consumer version number with reference number 56. Similarly, the software component representing the service provider 50 is designated as version five, as indicated by the service provider version number with reference number 58.

The service consumer 54, designated as version two, is configured to generate service request messages with outputs specified as "A", "B" and "C+", as indicated by the outputs shown with reference number 60. Similarly, the service consumer 54 is configured to receive messages with inputs specified as "W", "X", and "Y", as indicated by the expected inputs with reference number 62. However, the interface 64 of the processing logic 66 of the service provider 50, which is designated as version five, is configured to receive inputs specified as "A", "B", "C" and "D" (e.g., expected inputs 68), and send outputs "X", "W" and "Z" (e.g., outputs 70). For purposes of this example, it will be appreciated that the outputs of the service consumer 54 are the inputs of the service provider 50, and similarly, the inputs of the service consumer 54 are the outputs of the service provider 50. Furthermore, the inputs and outputs shown in the examples herein are presented for the purpose of conveying an inventive concept, and should not be taken as literal representations of inputs/outputs. It will be appreciated by those skilled in the art that an embodiment of the invention may utilize a wide variety of inputs and outputs having various types and attributes, such as integers, or character strings of varying lengths, and so on.

Because the expected inputs 68 of the current implementation of the service provider 50 differ from what version two of the service consumer 54 is configured to generate, in order for the service consumer 54 to communicate a message to the service provider 50, a message conversion must occur. Accordingly, service consumer 54 generates a service request message 52 and includes in the body 72 of the message the generated outputs—specifically "A", "B" and "C+". In addition, the service consumer 54 provides version mapping information 74 in a message header 76 of the service request message 52. In this case, the version mapping information 74, specified as "(2:5)", indicates the currently supported consumer version—designated as version two—and the current version of the service provider 50—designated as version five. After generating the service request message and addressing it to the service provider 50, the service consumer 54 sends the service request message to the service provider 50. In order for the service consumer 54 to initially obtain the current version of the service provider 50, the service provider 50 includes the current version in a message from the service provider 50. For instance, a service reply message sent from the service provider 50 to the service consumer 54 will include the current version of the service provider 50.

When the service request message 52 is received at the service provider 50, the message dispatcher 78 of the service provider 50 analyzes the service request message 52 to determine whether the message 52 includes version mapping information. In this case, the message 52 does include version mapping information 74, so the message dispatcher 78 dispatches the message 52 to the appropriate conversion algorithm 82 of the message converter 80. For purposes of this example, the appropriate conversion algorithm is the conversion algorithm that can convert the service request message 52 received from the service consumer 54 designated as version two, to a message suitable for processing by version five of the processing logic 66 of the service provider 50. In the present example, the selected conversion algorithm is shown in FIG. 3 with reference number 82 and is specified as conversion algorithm "(2/5)".

Once the message dispatcher 78 forwards the service request message 52 to the selected conversion algorithm 82, the message 52 is converted to ensure that it conforms to the specifications of the current implementation of the processing logic 66. Accordingly, the selected conversion algorithm 82 converts the service request message 52, for example, by translating or converting the inputs provided in the message to inputs that are expected by the current version (e.g., version five) of the processing logic 66. After converting the service request message, and in particular the inputs of the service request message, the message is forwarded to the processing logic 66 for processing. The particular processing task performed by the processing logic 66 will vary greatly depending upon the particular business process and implementation.

However, in general, the processing logic 66 will generate a service reply message including one or more outputs representing the results of the processing task. To ensure that the outputs generated by the processing logic 66 are expressed in a format suitable for consumption by the service consumer 54, the service reply message is analyzed by the previously selected conversion algorithm 82. If necessary, the outputs included in the service reply message are converted. Finally, the converted service reply message is communicated to the service consumer 54.

In one embodiment of the invention, a service consumer that is not initially aware of the current version of the service provider 50 may not include version mapping information in a service request message directed to the service provider 50. In this case, when the message dispatcher 78 analyzes the received service request message and determines no service mapping information has been included, the message dispatcher 78 forwards the service request message directly to the processing logic 66 of the service provider 50. If the processing logic 66 completes processing of the message without any errors occurring, the message dispatcher 78 will insert version mapping information into the service reply message that is sent to the service consumer 54. In particular, the message dispatcher 78 will set the version of the service consumer and the service provider to the current version (e.g., version five) of the service provider 50. For instance, if the current version of the service provider 50 is version five, and a request message received from a service consumer 54 has been successfully processed by version five of the service provider 50, the service provider 50 will automatically set the version mapping information to "(5:5)", such that the current version of the service consumer is set to version five, and the current version of the service provider is set to version five. This version mapping information will be included in the service reply message sent to the service consumer 54. Accordingly, the service consumer will then be able to provide the version mapping information in a subsequent service request message sent to the service provider 50.

In one embodiment of the invention, the message dispatcher 78 of the service provider 50 will, upon receiving a service request message including version mapping information 74, verify that the version of the service provider 50 specified in the version mapping information 74 is equivalent to the current version 58 of the service provider. If, for example, the version of the service provider has recently changed, then the version mapping information 78 may specify an old version of the service provider 50. When this happens, the message dispatcher 78 automatically forwards the service request message to a conversion algorithm for the current version of the service provider 50. For example, if the current version of the service provider 50 is designated as version five, and a service request message is received specifying version mapping information as "(2:4)", indicating that the current version of the service consumer is version two, and the last known compatible version of the service provider is version four, the message dispatcher 78 will automatically dispatch the service request message to a conversion algorithm designated as "(2/5)". After processing the service request message, the message dispatcher 78 will insert the new version mapping information (e.g., "(2:5)") into the service reply message so that the service consumer 54 can include the updated version mapping information in subsequent service request messages.

Figure 4:
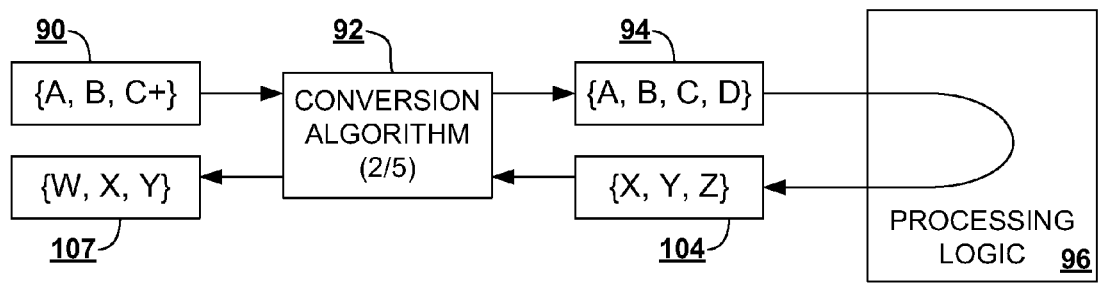
FIG. 4 illustrates an example of a data flow diagram indicating how a message is processed by a service provider, according to an embodiment of the invention.
Figure 4:
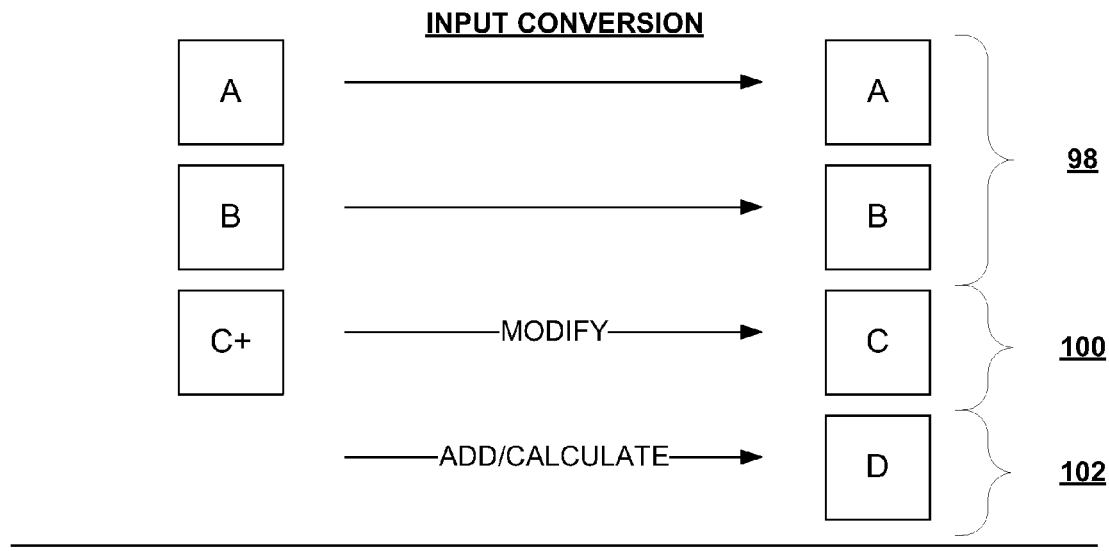
Figure 4:
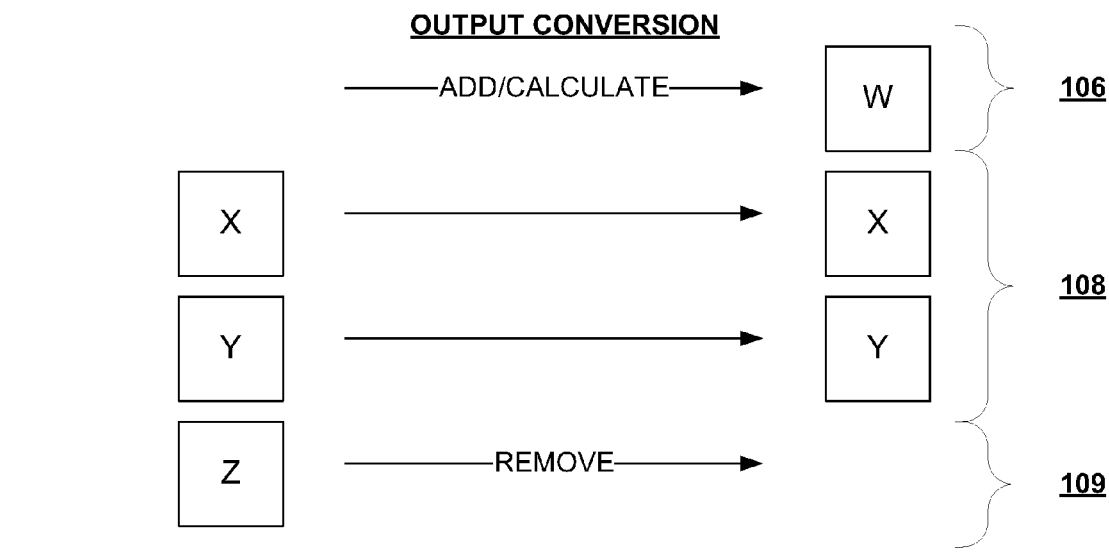

FIG. 4 illustrates an example of a data flow diagram indicating how a message is processed by a software component representing a service provider with version mapping functionality, according to an embodiment of the invention. There are a variety of reasons that a software component may be modified, resulting in a new version. In some cases, an interface specification may change as the result of a version change to a software component. For example, a change to an interface of a software component may result in more or less input/output elements being utilized or a change to an attribute of a particular input/output element. For instance, a particular input element originally specified as a character string may be changed to an integer. Similarly, an input/output element originally specified as a character string of length fifteen may be shortened to a length of five. According to one embodiment of the invention, when an interface specification changes as the result of a version change to a software component, a new conversion algorithm must be provided to handle the change.

As indicated below, a conversion algorithm may add or remove an input/output element of a particular message. Additionally, a conversion algorithm may modify or change a particular input/output element, for example, by converting a particular attribute of the element, such as its type or length. As illustrated in FIG. 4, a service request message 90 having inputs "A", "B" and "C+" is shown prior to being processed by the conversion algorithm with reference number 92. In this example, the expected inputs 94 at the processing logic 96 are specified as "A", "B", "C" and "D".

As indicated with respect to reference number 98, in this particular example the conversion algorithm 92 does not perform any processing on inputs "A" and "B", which conform to the interface specification of the processing logic 96. However, as indicated by reference numeral 100, the input designated as "C+" in the service request message 90 is modified by the conversion algorithm 92, resulting in a converted input "C" 100. For example, this conversion may represent a change in the input type from an integer to a character string, or a change to some other attribute of the input element. As the service request message 90 only includes three inputs, the conversion algorithm 92 generates a fourth input "D", as indicated by reference numeral 102, to ensure that the service request message conforms to the specification of the current version of the processing logic 96. In one embodiment of the invention, an input/output element may be generated by simply adding a specified default value as the input/output element, or alternatively, a value can be generated based in part on one or more other input/output elements. For instance, in the example shown in FIG. 4, the input element "D" may represent a date that can be calculated or determined based on the values of input elements "B" and "IC+".

After the processing logic 96 has performed its processing task, a service reply message 104 is generated with outputs "X", "Y" and "Z". The service reply message 104 is converted by the conversion algorithm 92 to ensure that the output elements conform to the specification of the current version of the service consumer. For instance, as illustrated in FIG. 4 with reference numeral 106, an output element "W" is added to service reply message 107. Output elements "X" and "Y" are not processed by the conversion algorithm 92, but are simply passed on, as indicated by reference numeral 108. As indicated by reference numeral 109, the conversion algorithm 92 removes output element "Z" from the service reply message 104, resulting in a converted service reply message 107. Again, the addition of element "W" may be based on a calculation, or alternatively, a default value may be used. In addition to adding, removing and modifying the input/output elements of a message, a conversion algorithm may also ensure that the format (e.g., the particular arrangement or order) of the input/output elements meets the requirements of a particular service to which the message is directed.

Figure 5:
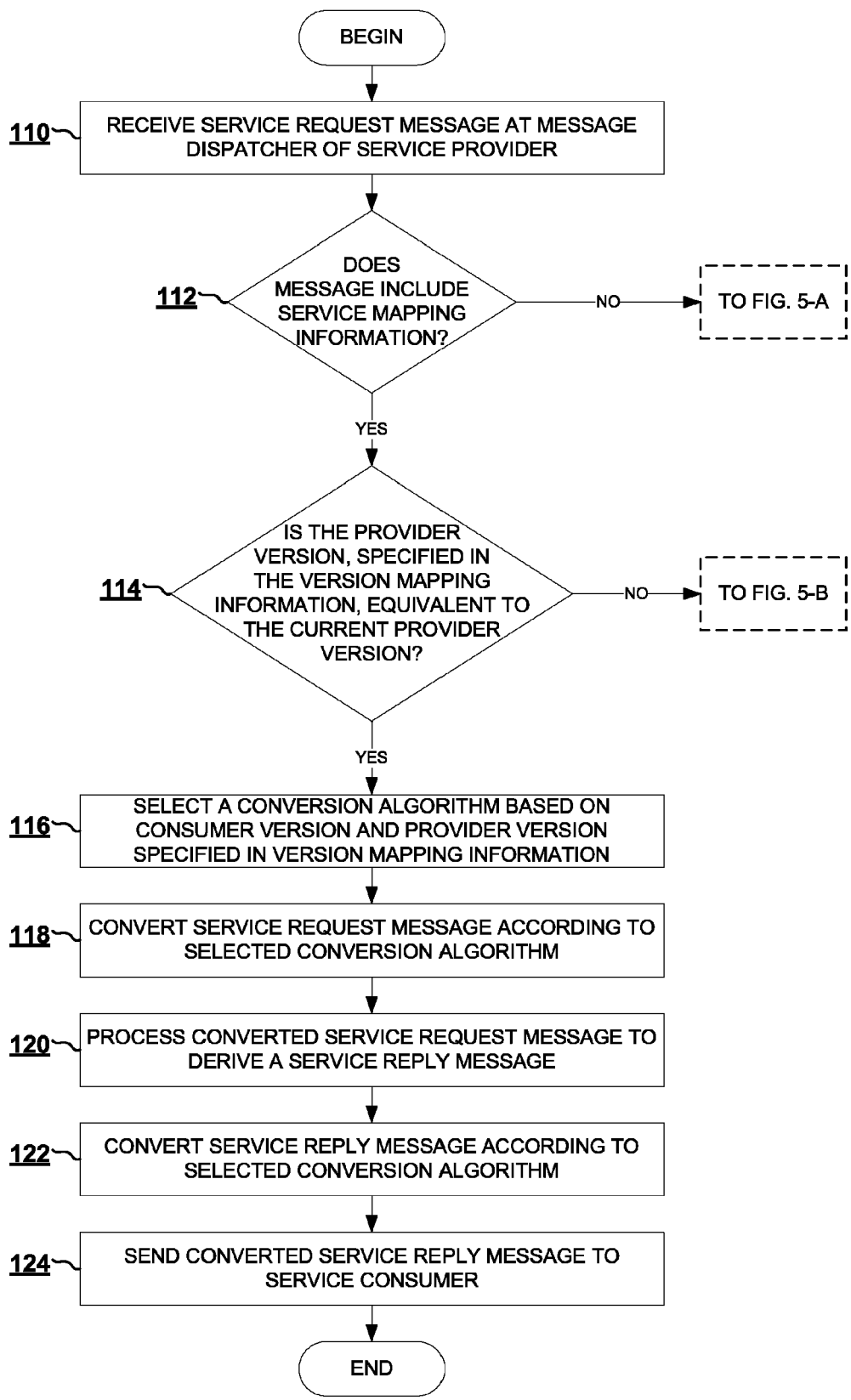
FIGS. 5, 5-A and 5-B illustrate an example of a method, according to an embodiment of the invention, for processing a service consumer's service request message.

FIGS. 5, 5-A and 5-B illustrate an example of a method, according to an embodiment of the invention, for processing a service consumer's service request message. At method operation 110, a service request message is received at a message dispatcher 38 of a service provider 32. The message dispatcher 38, at method operation 112, analyzes the service request message to determine whether the message specifies version mapping information. If the service request message specifies version mapping information, then at operation 114, the message dispatcher 38 determines whether the provider version, as specified in the version mapping information, is equivalent to the current version 34 of the service provider. For example, the message dispatcher 38 attempts to determine whether the service provider 32 has changed versions in the time since a message was last received from the particular service consumer 30. If the provider version specified in the version mapping information is equivalent to the current version of the service provider—indicating the service provider version has not recently change—then at method operation 116 the message dispatcher 38 selects a conversion algorithm from a plurality of available conversion algorithms to convert the service request message. In particular, the conversion algorithm is selected based on the version information of the service provider and service consumer, as indicated in the version mapping information included in the header of the service request message. Next, at method operation 118, the selected conversion algorithm is used to convert the service request message. For example, input elements may be modified, added or removed according to instructions specified by the particular selected conversion algorithm. Next, at method operation 120, the processing logic 48 processes the converted service request message, resulting in output elements that are included in a service reply message. At method operation 122, the previously selected conversion algorithm is used to convert the service reply message to ensure that the outputs generated by the processing logic 48 of the service provider 32 conform to the expected inputs of the service consumer 30. For instance, the conversion algorithm may add, remove, modify or rearrange one or more output elements. Finally, at method operation 124, the converted service reply message is communicated to the service consumer 30 for consumption.

Referring again to method operation 112, in one embodiment of the invention, if the message dispatcher 38 receives a service request message that does not include version mapping information, the message dispatcher 38 forwards the service request message directly to the processing logic 48 for processing. For instance, no conversion of the inputs occurs. Accordingly, at method operation 126 (FIG. 5-A), the processing logic 48 processes the message to derive a service reply message. If no error occurs during the processing of the service request message, then at method operation 128 the message dispatcher 38 inserts version mapping information into the service reply message before sending the service reply message to the service consumer 30 at method operation 130. In one embodiment of the invention, the version mapping information inserted into the service reply message indicates the current version of the service provider as the consumer version and the provider version. For instance, if the current version of the service provider is designated as version five, then the consumer version is set to version five, and the provider version is set to version five in the version mapping information. Accordingly, a subsequent service request message from the service consumer 30 will include the version mapping information, and the message dispatcher 38 can route the message as appropriate.

Referring again to method operation 114, when the message dispatcher 38 receives a message from a service consumer 30 that includes version mapping information, the message dispatcher 38 determines whether the provider version, as specified in the version mapping information, is equivalent to the current version of the service provider 32. If the provider version specified in the version mapping information is not equivalent to the current version 34 of the service provider, then at method operation 132 (FIG. 5-B) the message dispatcher 38 selects a conversion algorithm based on the consumer version, as specified in the version mapping information, and the current version 34 of the service provider. For instance, if the current version of the service provider 32 is designated as version five, and the version mapping information is specified as "(2:3)", indicating that the consumer version is designated as version two, and the provider version is designated as version three, the message dispatcher 38 would realize this difference between the service provider version specified in the version mapping information (e.g., version three) and the current version of the service provider (e.g., version five), and route the message to the conversion algorithm specified as "(2/5)" so the message would be converted to conform to the current version of the service provider 32. Accordingly, at method operation 134 the service request message is converted in accordance with the selected conversion algorithm.

At method operation 136 the processing logic 48 of the service provider 32 processes the service request message to derive outputs included in a service reply message. Next, at method operation 138 the service reply message is converted according to the previously selected conversion algorithm. At method operation 140, the message dispatcher 38 or another component of the service provider inserts into the converted service reply message the updated version mapping information (e.g., "(2:5)"). In particular, the service provider version is updated in the version mapping information that is sent to the service consumer 30. Finally, at method operation 142 the converted service reply message with updated version mapping information is sent to the service consumer 30.

In yet another embodiment of the invention, a software development tool with a graphical user interface (GUI) allows for the automatic generation of software code representing the required conversion algorithms used for the conversion of messages. For instance, each time a new version of a software component is developed and deployed, one or more conversion algorithms may be necessary to provide backwards compatibility with other software components. Accordingly, one embodiment of the invention provides a software development tool with a graphical user interface for quickly and rapidly developing the necessary software code used to convert messages.

Figure 6:
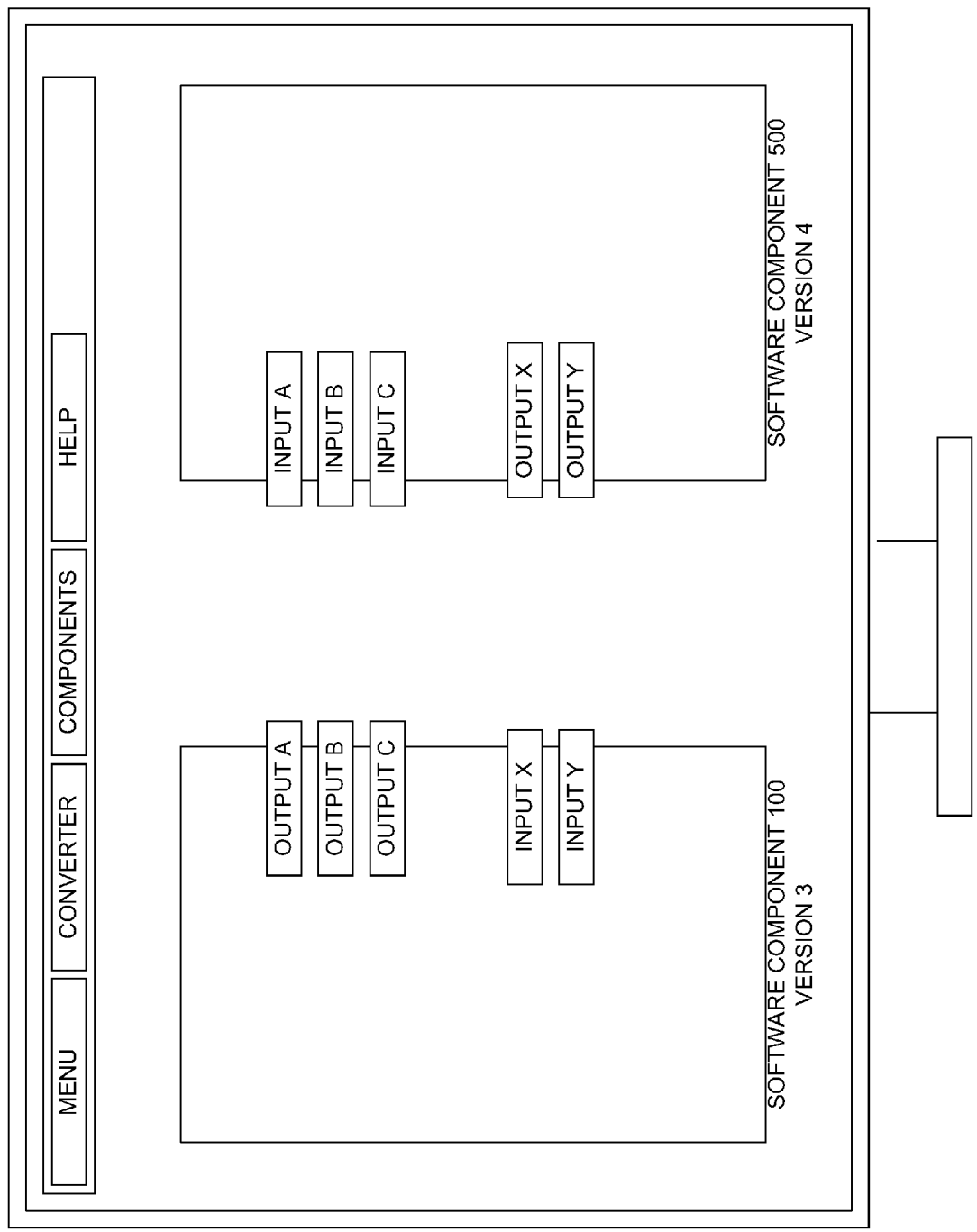
FIG. 6 illustrates an example user interface of a software development tool for the rapid generation code representing conversion algorithms, according to an embodiment of the invention.

FIG. 6 illustrates an example user interface of a software development tool for the rapid generation of conversion logic, according to an embodiment of the invention. As illustrated in FIG. 6, a graphical user interface shows a graphical representation of two software components having different version numbers. Furthermore, the various inputs and outputs of the two software components are graphically depicted. In one embodiment of the invention, a software developer can utilize the GUI to manipulate the graphical representation of the inputs and outputs to quickly generate code representing the conversion algorithms of a particular software component. For instance, a developer may simply point and click on a particular input or output to facilitate defining the required conversions necessary to convert the input or output to conform to the interface specification of a particular version of a software component. Once the proper conversions have been defined, in one embodiment, a developer simply instructs the tool to automatically generate the required code modules, for example, by "clicking" or "pressing" a user interface element, such as a button.

Figure 7:
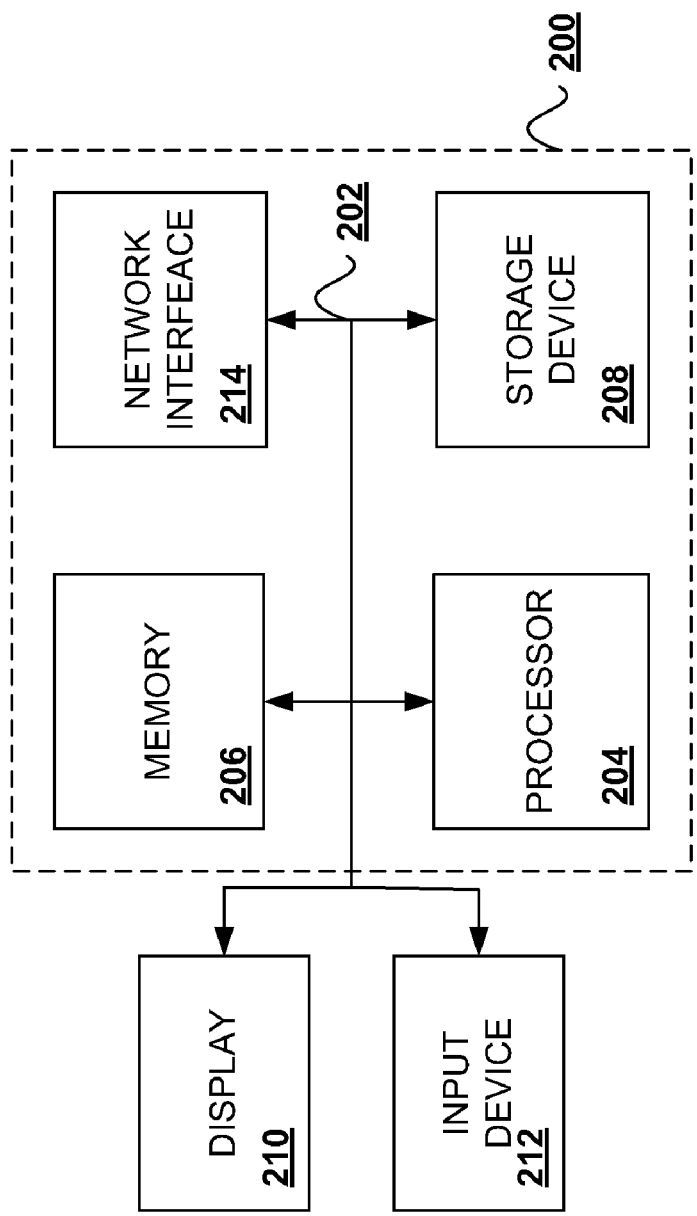
FIG. 7 is a block diagram of an example computer system, which might be utilized to implement various embodiments of the present invention.

FIG. 7 is a block diagram of an example computer system 200, which might be utilized to implement various embodiments of the present invention. Computer system 200 includes a bus 202 or other communication mechanism for communicating information, and a processor 204 coupled with bus 202 for processing information. Computer system 200 also includes a memory 206 coupled to bus 202 for storing information and instructions to be executed by processor 204, including information and instructions for performing the methods and techniques described above. This memory may also be used for storing temporary variables or other intermediate processing information during execution of instructions to be executed by processor 204. Possible implementations of this memory may be, but are not limited to, random access memory (RAM), read only memory (ROM), or both. A non-volatile mass storage device 208 is also provided for storing information and instructions. Common forms of storage devices include, for example, a hard drive, a magnetic disk, an optical disk, a CD-ROM, a DVD, a flash memory, a USB memory card, a solid state drive or any other medium from which a computer can read. Storage device 208 may be utilized to store source code, binary code, or software files for performing the methods and/or techniques described above, or for embodying the constructs above, for example. In one embodiment of the invention, a computer program product for performing the methods described above may be stored on a computer-readable medium, such as storage device 208.

Computer system 200 may be coupled via bus 202 (or another bus) to a display 210, such as a cathode ray tube (CRT), liquid crystal display (LCD), or organic light emitting diode (OLED) display for displaying information to a computer user. An input device 212 such as a keyboard and/or mouse is coupled to bus 202 for communicating information and command selections from the user to processor 204. The combination of these components allows the user to communicate with the system. In some systems, bus 202 may be divided into multiple specialized buses.

Computer system 200 also includes a network interface 214 coupled with bus 202. Network interface 214 may provide two-way data communication between computer system 200 and a local area network (LAN). The network interface 214 may be a digital subscriber line (DSL) or other modem device to provide a data communication connection over a telephone line, for example. Another example of the network interface is a network interface card (NIC) to provide a data communication connection to a compatible LAN. Wireless communication links may also be established, for example, with a wireless network interface card. In any such implementation, network interface 214 sends and receives electrical, electromagnetic, or optical signals that carry digital data streams representing various types of information.

Computer system 200 can send and receive information, including messages or other interface actions, through the network interface 214 to a private or public intranet or internet. In the internet example, software components or services may reside on multiple different computer systems or servers across the network. A server may transmit actions or messages from one component, through an internet, local network, and/or network interface 214 to a component on computer system 200.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   at a service provider, analyzing a service request message received from a service consumer to determine whether the service request message specifies version mapping information;
   if the service request message specifies version mapping information, selecting a conversion algorithm based on the version mapping information specified in the service request message;
   converting the service request message according to the selected conversion algorithm before processing the converted service request message to derive a service reply message; and
   converting the service reply message according to the selected conversion algorithm before sending the converted service reply message to the service consumer.

2. The computer-implemented method of claim 1, wherein selecting a conversion algorithm based on the version mapping information specified in the service request message includes:
   identifying a consumer version and a provider version specified in the version mapping information; and
   if the provider version specified in the version mapping information is equivalent to a current version of the service provider, selecting a conversion algorithm configured to convert the service request message from a format consistent with the consumer version specified in the version mapping information to a format consistent with the provider version specified in the version mapping information.

3. The computer-implemented method of claim 1, wherein selecting a conversion algorithm based on the version mapping information specified in the service request message includes:
   identifying a consumer version and a provider version specified in the version mapping information;
   if the provider version specified in the version mapping information is not equivalent to a current version of the service provider, selecting a conversion algorithm configured to convert the service request message from a format consistent with the consumer version specified in the version mapping information to a format consistent with the current version of the service provider; and
   sending to the service consumer a service reply message including version mapping information indicating the current version of the service provider.

4. The computer-implemented method of claim 1, wherein converting the service request message according to the selected conversion algorithm includes one or more of: modifying a number of input elements specified in the service request message; performing a data calculation to derive an input element to be included in the service request message; and, modifying an attribute of an input element specified in the service request message.

5. The computer-implemented method of claim 1, wherein converting the service reply message according to the selected conversion algorithm includes one or more of: modifying a number of output elements specified in the service reply message; performing a data calculation to derive an output element to be included in the service request message; and, modifying an attribute of an output element specified in the service request message.

6. The computer-implemented method of claim 1, further comprising
if the service request message does not specify version mapping information, processing the service request message to derive a service reply message; and
if the service request message is processed without error, inserting version mapping information in the service reply message prior to sending the service reply message to the service consumer.

7. The computer-implemented method of claim 6, wherein the version mapping information inserted into the service reply message specifies a consumer version and a provider version, and both the consumer version and the provider version are set to a current version of the service provider.

8. The computer-implemented method of claim 6, further comprising:
after inserting version mapping information in a service reply message and sending the service reply message to the service consumer, receiving a second service request message from the service consumer, wherein the second service request message includes the version mapping information previously inserted into the service reply message;
selecting a conversion algorithm based on the version mapping information specified in the second service request message;
converting the second service request message according to the selected conversion algorithm before processing the converted second service request message to derive a second service reply message; and
converting the second service reply message according to the selected conversion algorithm before sending the converted second service reply message to the service consumer.

9. A computer-readable medium having instructions stored thereon, which, when executed by a computer, cause the computer to:
analyze, at a service provider, a service request message received from a service consumer to determine whether the service request message specifies version mapping information;
if the service request message specifies version mapping information, select a conversion algorithm based on the version mapping information specified in the service request message;
convert the service request message according to the selected conversion algorithm before processing the converted service request message to derive a service reply message; and
convert the service reply message according to the selected conversion algorithm before sending the converted service reply message to the service consumer.

10. The computer-readable medium of claim 9, wherein selecting a conversion algorithm based on the version mapping information specified in the service request message includes:
identifying a consumer version and a provider version specified in the version mapping information; and
if the provider version specified in the version mapping information is equivalent to a current version of the service provider, selecting a conversion algorithm configured to convert the service request message from a format consistent with the consumer version specified in the version mapping information to a format consistent with the provider version specified in the version mapping information.

11. The computer-readable medium of claim 9, wherein selecting a conversion algorithm based on the version mapping information specified in the service request message includes:
identifying a consumer version and a provider version specified in the version mapping information;
if the provider version specified in the version mapping information is not equivalent to a current version of the service provider, selecting a conversion algorithm configured to convert the service request message from a format consistent with the consumer version specified in the version mapping information to a format consistent with the current version of the service provider; and
sending to the service consumer a service reply message including version mapping information indicating the current version of the service provider.

12. The computer-readable medium of claim 9, wherein converting the service request message according to the selected conversion algorithm includes one or more of: modifying a number of input elements specified in the service request message; performing a data calculation to derive an input element to be included in the service request message; and, modifying an attribute of an input element specified in the service request message.

13. The computer-readable medium of claim 9, wherein converting the service reply message according to the selected conversion algorithm includes one or more of: modifying a number of output elements specified in the service reply message; performing a data calculation to derive an output element to be included in the service reply message; and, modifying an attribute of an output element specified in the service reply message.

14. The computer-readable medium of claim 9, having further instructions, which, when executed, cause the computer to:
process the service request message to derive a service reply message if the service request message does not specify version mapping information; and
if the service request message is processed without error, insert version mapping information in the service reply message prior to sending the service reply message to the service consumer.

15. The computer-readable medium of claim 14, wherein the version mapping information inserted into the service reply message specifies a consumer version and a provider version, and both the consumer version and the provider version are set to a current version of the service provider.

16. The computer-readable medium of claim 9, having further instructions, which, when executed, cause the computer to:
receive a second service request message from the service consumer after inserting version mapping information in a service reply message and sending the service reply message to the service consumer, wherein the second service request message includes the version mapping information previously inserted into the service reply message;
select a conversion algorithm based on the version mapping information specified in the second service request message;
converting the second service request message according to the selected conversion algorithm before processing the converted second service request message to derive a second service reply message; and converting the second service reply message according to the selected conversion algorithm before sending the converted second service reply message to the service consumer.

17. An apparatus having a processor and memory for executing instructions, said apparatus further comprising:
- a message dispatcher configured to analyze a service request message received at a service provider from a service consumer to determine whether the service request message specifies version mapping information, and to select a conversion algorithm based on the version mapping information specified in the service request message if the service request message specifies version mapping information;
- a message converter configured to convert the service request message according to the conversion algorithm selected by the message dispatcher, and to convert a service reply message according to the conversion algorithm selected by the message dispatcher; and
- processing logic to process the converted service request message to derive the service reply message before the service provider sends the service reply message to the service consumer.

18. The apparatus of claim 17, wherein the message dispatcher is configured to identify a consumer version and a provider version specified in the version mapping information, and to select a conversion algorithm configured to convert the service request message from a format consistent with the consumer version specified in the version mapping information to a format consistent with the provider version specified in the version mapping information, if the provider version specified in the version mapping information is equivalent to a current version of the service provider.

19. The apparatus of claim 17, wherein the message dispatcher is configured to i) dispatch the service request message directly to the processing logic if the service request message does not specify version mapping information, and ii) insert version mapping information in a service reply message before the service provider sends the service reply message to the service consumer, if the service request message is processed by the processing logic without error.

20. The apparatus of claim 17, further comprising a version identification to indicate a current version of the processing logic of the service provider.

* * * * *